US012633204B2

(12) United States Patent
Tran et al.

(10) Patent No.: US 12,633,204 B2
(45) Date of Patent: May 19, 2026

(54) COMPUTER, SYSTEM AND METHOD

(71) Applicant: Nicoventures Trading Limited,
London (GB)

(72) Inventors: My-Linh Tran, London (GB); Robert Kersey, London (GB); Stephen Potter, London (GB)

(73) Assignee: Nicoventures Trading Limited,
London (GB)

( * ) Notice: Subject to any disclaimer, the term of this patent is extended or adjusted under 35 U.S.C. 154(b) by 328 days.

(21) Appl. No.: 18/250,015

(22) PCT Filed: Oct. 14, 2021

(86) PCT No.: PCT/GB2021/052658
§ 371 (c)(1),
(2) Date: Apr. 21, 2023

(87) PCT Pub. No.: WO2022/084653
PCT Pub. Date: Apr. 28, 2022

(65) Prior Publication Data
US 2023/0394949 A1     Dec. 7, 2023

(30) Foreign Application Priority Data

Oct. 22, 2020    (GB) ..................................... 2016764

(51) Int. Cl.
*G08B 21/18*          (2006.01)
*G06Q 10/0637*     (2023.01)
(Continued)

(52) U.S. Cl.
CPC ..... *G08B 21/182* (2013.01); *G06Q 10/06375* (2013.01); *A24F 40/10* (2020.01);
(Continued)

(58) Field of Classification Search
CPC .......... G08B 21/182; G06Q 10/06375; G06Q 30/0185; H04W 84/12; A24F 15/015;
(Continued)

(56) References Cited

U.S. PATENT DOCUMENTS 10,081,531 B2 *    9/2018    Murison ................ B67D 7/346
10,285,449 B2 *    5/2019    Murison .............. A61M 11/042
(Continued)

FOREIGN PATENT DOCUMENTS

WO          2020074929 A1       4/2020
WO      WO-2020165131 A1 *    8/2020    ............. A24F 40/42
WO          2021019080 A1       2/2021

OTHER PUBLICATIONS

WO-2020165131-A1 English Translation of Specification (Year: 2025).*
(Continued)

*Primary Examiner* — Kenneth Rinehart
*Assistant Examiner* — Stephanie A Shrieves
(74) *Attorney, Agent, or Firm* — BURR & FORMAN

(57)          ABSTRACT

A computer is configured to receive, from a refilling device for an article of an aerosol provision system associated with the computer via a remote data store using a wireless communications protocol, an indication of a number of times the article of the aerosol provision system has been refilled with aerosol generating material. The computer is then configured to provide the indication to a user of the computer.

23 Claims, 5 Drawing Sheets

(51) Int. Cl.

| | |
|---|---|
| *A24F 40/10* | (2020.01) |
| *A24F 40/53* | (2020.01) |
| *A24F 40/65* | (2020.01) |
| *H04W 84/12* | (2009.01) |

(52) U.S. Cl.
CPC .............. *A24F 40/53* (2020.01); *A24F 40/65* (2020.01); *H04W 84/12* (2013.01)

(58) Field of Classification Search
CPC .......... A24F 40/10; A24F 40/42; A24F 40/53; A24F 40/65; A24F 40/50; A24F 40/60; B65B 3/04; B65B 57/04
USPC ........................................................... 141/3
See application file for complete search history.

(56) References Cited

U.S. PATENT DOCUMENTS

| | | | |
|---|---|---|---|
| 10,759,554 B2* | 9/2020 | Sebastian | B65D 51/18 |
| 11,213,061 B2* | 1/2022 | Tseng | B01F 31/60 |
| 2015/0245654 A1* | 9/2015 | Memari | A24F 40/50 141/2 |
| 2015/0245656 A1* | 9/2015 | Memari | A24F 40/60 206/242 |
| 2016/0150824 A1 | 6/2016 | Memari et al. | |
| 2017/0233114 A1* | 8/2017 | Christensen | B65B 3/14 141/2 |
| 2018/0060873 A1* | 3/2018 | Chu | G06K 19/10 |
| 2019/0158938 A1* | 5/2019 | Bowen | A24F 40/65 |
| 2020/0000143 A1* | 1/2020 | Anderson | G06F 3/16 |
| 2020/0237014 A1* | 7/2020 | Lee | A24F 40/65 |
| 2021/0337878 A1* | 11/2021 | Gretton | A24F 40/57 |
| 2021/0401061 A1* | 12/2021 | Davis | A24F 40/57 |

OTHER PUBLICATIONS

International Search Report and Written Opinion received for PCT Patent Application No. PCT/GB2021/052658, mailed on Jan. 24, 2022, 14 pages.
Search Report received for Great Britain Patent Application No. 2016764.9, mailed on Apr. 6, 2021, 3 pages.

* cited by examiner

COMPUTER, SYSTEM AND METHOD

PRIORITY CLAIM

The present application is a National Phase entry of PCT Application No. PCT/GB2021/052658, filed Oct. 14, 2021, which claims priority from GB Application No. 2016764.9, filed Oct. 22, 2020, each of which hereby fully incorporated herein by reference.

TECHNICAL FIELD

The present disclosure relates to a computer, a system and a method.

BACKGROUND

Electronic aerosol provision systems such as electronic cigarettes (e-cigarettes) generally contain an aerosol-generating material, such as a reservoir of a source liquid containing a formulation, typically including nicotine, or a solid material such as a tobacco-based product, from which an aerosol is generated for inhalation by a user, for example through heat vaporization. Thus, an aerosol provision system will typically comprise an aerosol generator, e.g. a heating element, arranged to aerosolize a portion of aerosol-generating material to generate an aerosol in an aerosol generation region of an air channel through the aerosol provision system. As a user inhales on the device and electrical power is supplied to the aerosol generator, air is drawn into the device through one or more inlet holes and along the air channel to the aerosol generation region, where the air mixes with the vaporized aerosol generator and forms a condensation aerosol. The air drawn through the aerosol generation region continues along the air channel to a mouthpiece, carrying some of the aerosol with it, and out through the mouthpiece for inhalation by the user.

It is common for aerosol provision systems to comprise a modular assembly, often having two main functional parts, namely an aerosol provision device and an article. Typically the article will comprise the consumable aerosol-generating material and the aerosol generator (heating element), while the aerosol provision device part will comprise longer-life items, such as a rechargeable battery, device control circuitry and user interface features. The aerosol provision device may also be referred to as a reusable part or battery section and the article may also be referred to as a consumable, disposable/replaceable part, cartridge or cartomizer.

The aerosol provision device and article are mechanically coupled together at an interface for use, for example using a screw thread, bayonet, latched or friction fit fixing. When the aerosol-generating material in an article has been exhausted, or the user wishes to switch to a different article having a different aerosol-generating material, the article may be removed from the aerosol provision device and a replacement article may be attached to the device in its place. Alternatively, some articles are configured such that, after the aerosol-generating material in the article has been exhausted, the article can be refilled with more aerosol-generating material, thereby allowing the article to be reused. In this example, the user is able to refill the article using a separate reservoir of aerosol-generating material. The aerosol-generating material used to refill the article may be the same or different to the previous aerosol-generating material in the article, thereby allowing the user to change to a different aerosol-generating material without purchasing a new article.

Refilling the article with aerosol-generating material extends the life of the article as its use is no longer limited by the volume or amount of aerosol-generating material that the article can hold. The also provides other benefits, since replacement articles are not required, the article can simply be refilled with aerosol-generating material. The user may be unaware of the amount of use the article is had or has remaining before it deteriorates, the number of times the article has been refilled or the benefit refilling the article has had.

Various approaches are described herein which seek to help address or mitigate some of the issues discussed above.

SUMMARY

In accordance with some embodiments described herein, there is provided a computer configured to receive, from a refilling device for an article of an aerosol provision system associated with the computer via a remote data store using a wireless communications protocol, an indication of a number of times the article of the aerosol provision system has been refilled with aerosol generating material. The computer is then configured to provide the indication to a user of the computer.

The indication can be a value of a counter indicative of a number of times the article has been refilled and/or indicate that the article is expired. The computer can be configured to provide a notification to a user of the refilling device based on the indication that the article is expired.

The computer can be configured to determine one or more benefits of refilling the article based on the indication of the number of times the article of the aerosol provision system has been refilled with aerosol generating material. The benefits can comprise a cost benefit and or a material saving. The computer can be configured to receive benefit data from a remote source, and determine the benefits based on the received benefit data. The computer can also a notification to the user of the computer based on the benefits.

The computer can be configured to receive, from the refilling device via the remote data store using the wireless communications protocol, data indicative of whether the article is authentic. The computer can be configured to provide a notification to the user of the computer based on the data indicative of whether the article is authentic.

The computer can be configured to receive, from the refilling device via the remote data store using the wireless communications protocol, article data, wherein the article data comprises data indicative of an amount of aerosol-generating material stored in the article. The computer can be configured to provide a notification to the user of the computer based on the data indicative of the amount of aerosol-generating material stored in the article. The notification can provide an indication of a number of times the aerosol-generating material can be transferred to the article before the article expires.

The computer can be configured to receive, from an aerosol provision device of the aerosol provision system, device data. The device data can be received from the aerosol provision device using a different wireless communication protocol to the wireless communication protocol used to receive, from the refilling device via the remote data store, the indication of the number of times the article of the aerosol provision system has been refilled with aerosol generating material. The wireless communication protocol used to receive the device data can be Bluetooth. The computer can be configured to receive, from the refilling device via the remote data store using the wireless communications protocol, device data. The computer can be configured to provide a notification to a user of the computer based on the device data.

The computer can be configured to receive, from the refilling device via the remote data store using the wireless communications protocol, reservoir data, wherein the reservoir data comprises data indicative of an amount of aerosol-generating material stored in a reservoir coupled to the refilling device. The computer is can be further configured to provide a notification to a user of the computer based on the data indicative of the amount of aerosol-generating material stored in the reservoir.

The computer can be a mobile device.

The wireless communications protocol can be Wi-Fi.

In accordance with some embodiments described herein, there is provided a system comprising the computer described herein and a refilling device. The refilling device is configured to transmit the indication to the computer via a remote data store using a wireless communications protocol.

In accordance with some embodiments described herein, there is provided a method. The method comprises receiving, from a refilling device for an article of an aerosol provision system via a remote data store using a wireless communications protocol, an indication of a number of times the article of the aerosol provision system has been refilled with aerosol generating material, and providing the indication to a user.

There is also provided a computer readable storage medium comprising instructions which, when executed by a processor, performs the above method.

These aspects and other aspects will be apparent from the following detailed description. In this regard, particular sections of the description are not to be read in isolation from other sections.

BRIEF DESCRIPTION OF DRAWINGS

Embodiments of the disclosure will now be described, by way of example only, with reference to accompanying drawings, in which.

DETAILED DESCRIPTION

Aspects and features of certain examples and embodiments are discussed/described herein. Some aspects and features of certain examples and embodiments may be implemented conventionally and these are not discussed/described in detail in the interests of brevity. It will thus be appreciated that aspects and features of articles and systems discussed herein which are not described in detail may be implemented in accordance with any conventional techniques for implementing such aspects and features.

The present disclosure relates to aerosol provision systems, which may also be referred to as aerosol provision systems, such as e-cigarettes. Throughout the following description the term "e-cigarette" or "electronic cigarette"

may sometimes be used, but it will be appreciated this term may be used interchangeably with aerosol provision system and electronic aerosol provision system.

As noted above, aerosol provision systems (e-cigarettes) often comprise a modular assembly including both a reusable part (aerosol provision device) and a replaceable (disposable) or refillable cartridge part, referred to as an article. Systems conforming to this type of two-part modular configuration may generally be referred to as two-part systems or devices. It is also common for electronic cigarettes to have a generally elongate shape. For the sake of providing a concrete example, certain embodiments of the disclosure described herein comprise this kind of generally elongate two-part system employing refillable cartridges. However, it will be appreciated the underlying principles described herein may equally be adopted for other electronic cigarette configurations, for example modular systems comprising more than two parts, as devices conforming to other overall shapes, for example based on so-called box-mod high performance devices that typically have a more boxy shape.

As described above, the present disclosure relates to (but it not limited to) refilling devices for articles of aerosol provision systems, such as e-cigarettes and electronic cigarettes.

Figure 1:
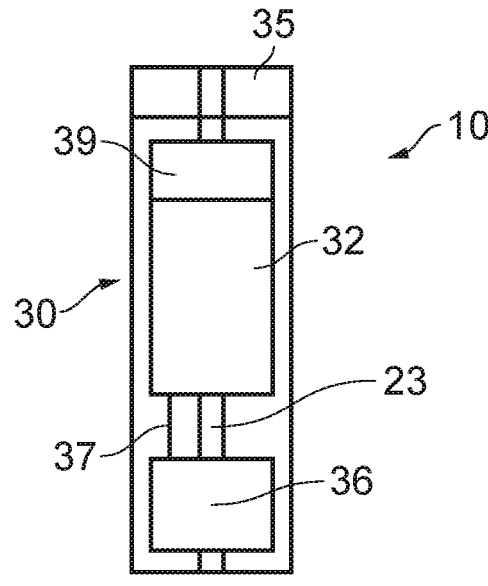
FIG. 1 is a schematic diagram of an aerosol provision system.
Figure 1:
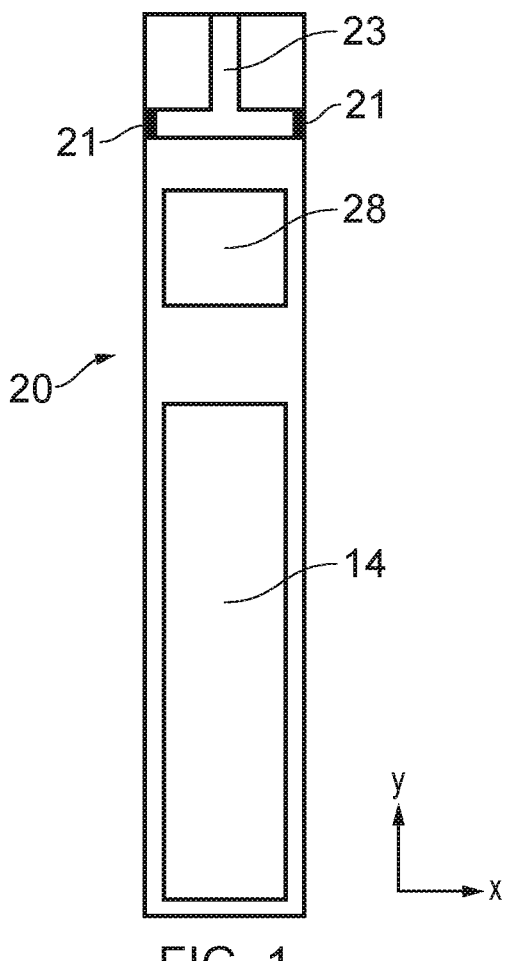

FIG. 1 is a highly schematic diagram (not to scale) of an example aerosol provision system 10, such as an e-cigarette, to which embodiments are applicable. The aerosol provision system 10 has a generally cylindrical shape, extending along a longitudinal or y axis as indicated by the axes (although aspects of the disclosure are applicable to e-cigarettes configured in other shapes and arrangements), and comprises two main components, namely an aerosol provision device 20 and an article 30.

The article 30 comprises or consists of aerosol-generating material 32, part or all of which is intended to be consumed during use by a user. An article 30 may comprise one or more other components, such as an aerosol-generating material storage area 39, an aerosol-generating material transfer component 37, an aerosol generation area, a housing, a wrapper, a mouthpiece 35, a filter and/or an aerosol-modifying agent.

An article 30 may also comprise an aerosol generator 36, such as a heating element, that emits heat to cause the aerosol-generating material 32 to generate aerosol in use. The aerosol generator 36 may, for example, comprise combustible material, a material heatable by electrical conduction, or a susceptor. It should be noted that it is possible for the aerosol generator 36 to be part of the aerosol provision device 20 and the article 30 then may comprise the aerosol-generating material storage area 39 for the aerosol-generating material 32 such that, when the article 30 is coupled with the aerosol provision device 20, the aerosol-generating material 32 can be transferred to the aerosol generator 36 in the aerosol provision device 20.

Aerosol-generating material is a material that is capable of generating aerosol, for example when heated, irradiated or energized in any other way. The aerosol-generating material 32 may, for example, be in the form of a solid, liquid or gel which may or may not contain an active substance and/or flavorants. In some embodiments, the aerosol-generating material 32 may comprise an "amorphous solid", which may alternatively be referred to as a "monolithic solid" (i.e. non-fibrous). In some embodiments, the amorphous solid may be a dried gel. The amorphous solid is a solid material that may retain some fluid, such as liquid, within it. In some embodiments, the aerosol-generating material 32 may for example comprise from about 50 wt %, 60 wt % or 70 wt % of amorphous solid, to about 90 wt %, 95 wt % or 100 wt % of amorphous solid.

The aerosol-generating material comprises one or more ingredients, such as one or more active substances and/or flavorants, one or more aerosol-former materials, and optionally one or more other functional materials such as pH regulators, coloring agents, preservatives, binders, fillers, stabilizers, and/or antioxidants.

The active substance as used herein may be a physiologically active material, which is a material intended to achieve or enhance a physiological response. The active substance may for example be selected from nutraceuticals, nootropics, and psychoactives. The active substance may be naturally occurring or synthetically obtained. The active substance may comprise for example nicotine, caffeine, taurine, theine, vitamins such as B6 or B12 or C, melatonin, cannabinoids, or constituents, derivatives, or combinations thereof. The active substance may comprise one or more constituents, derivatives or extracts of tobacco, cannabis or another botanical.

In some embodiments, the active substance comprises nicotine. In some embodiments, the active substance comprises caffeine, melatonin or vitamin B12.

The aerosol provision device 20 includes a power source 14, such as a battery, configured to supply electrical power to the aerosol generator 36. The power source 14 in this example is rechargeable and may be of a conventional type, for example of the kind normally used in electronic cigarettes and other applications requiring provision of relatively high currents over relatively short periods. The battery 14 may be recharged through the charging port (not illustrated), which may, for example, comprise a USB connector.

The aerosol provision device 20 includes device control circuitry 28 configured to control the operation of the aerosol provision system 10 and provide conventional operating functions in line with the established techniques for controlling aerosol provision systems such as electronic cigarettes. The device control circuitry (processor circuitry) 28 may be considered to logically comprise various subunits/circuitry elements associated with different aspects of the electronic cigarette's operation. For example, depending on the functionality provided in different implementations, the device control circuitry 28 may comprises power source control circuitry for controlling the supply of electrical power from the power source 14 to the aerosol generator 36, user programming circuitry for establishing configuration settings (e.g. user-defined power settings) in response to user input, as well as other functional units/circuitry associated functionality in accordance with the principles described herein and conventional operating aspects of electronic cigarettes. It will be appreciated the functionality of the device control circuitry 28 can be provided in various different ways, for example using one or more suitably programmed programmable computer(s) and/or one or more suitably configured application-specific integrated circuit(s)/ circuitry/chip(s)/chipset(s) configured to provide the desired functionality.

The aerosol provision device 20 includes one or more air inlets 21. In use, as a user inhales on the mouthpiece 35, air is drawn into the aerosol provision device 20 through the air inlets 21 and along an air channel 23 to the aerosol generator 36, where the air mixes with the vaporized aerosol-generating material 32 and forms a condensation aerosol. The air drawn through the aerosol generator 36 continues along the air channel 23 to a mouthpiece 35, carrying some of the aerosol with it, and out through the mouthpiece 35 for inhalation by the user. Alternatively, the one or more air inlets 21 may be included on the article 30, such that the air channel 23 is entirely contained within the article 30.

By way of a concrete example, the article 30 comprises a housing (formed, e.g., from a plastics material), an aerosol-generating material storage area 39 formed within the housing for containing the aerosol-generating material 32 (which in this example may be a liquid which may or may not contain nicotine), an aerosol-generating material transfer component 37 (which in this example is a wick formed of e.g., glass or cotton fibers, or a ceramic material configured to transport the liquid from the reservoir using capillary action), an aerosol-generating area containing the aerosol generator 36, and a mouthpiece 35. Although not shown, a filter and/or aerosol modifying agent (such as a flavor imparting material) may be located in, or in proximity to, the mouthpiece 35. The aerosol generator 36 of this example comprises a heater element formed from an electrically resistive material (such as NiCr8020) spirally wrapped around the aerosol-generating material transfer component 37, and located in the air channel 23. The area around the heating element and wick combination is the aerosol-generating area of the article 30.

Figure 2:
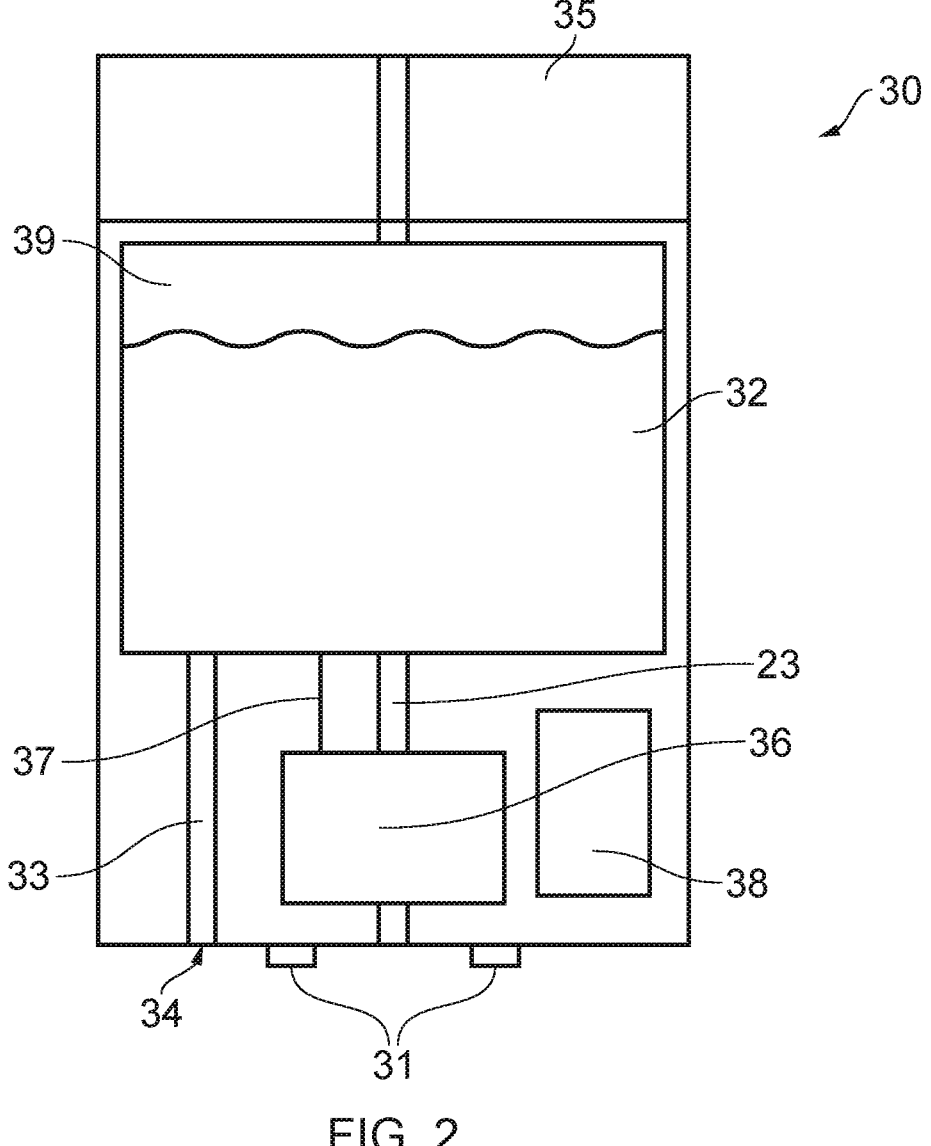
FIG. 2 is a schematic diagram of an example article for use in the aerosol provision system illustrated in FIG. 1.

FIG. 2 is a schematic diagram of an example article 30 for use in the aerosol provision system 10 illustrated in FIG. 1, where the same reference signs have been used for like elements between the article 30 illustrated in FIG. 1 and the article 30 illustrated in FIG. 2. As per the article 30 illustrated in FIG. 1, the article 30 illustrated in FIG. 2 includes an aerosol-generating material storage area 39 for storing an aerosol-generating material 32, an aerosol-generating material transfer component 37, an aerosol generation area containing an aerosol generator 36, and a mouthpiece 35.

The article 30 illustrated in FIG. 2 is configured to be refilled and reused. In other words, the aerosol-generating material storage area 39 of the article 30 illustrated in FIG. 2 can be refilled with aerosol-generating material 32 once some or all of the aerosol-generating material 32 contained in the aerosol-generating material storage area 39 has been exhausted or depleted. To facilitate the refilling or replenishment of aerosol-generating material 32, the article 30 has a refilling tube 33 extending between the aerosol-generating material storage area 39 and the exterior or an outer surface of the housing of the article 30, thereby creating a refilling orifice 34. Aerosol-generating material 32 can then be inserted into the aerosol-generating material storage area 39 via the refilling orifice 34 and refilling tube 33. It will be appreciated, however, that such a configuration of a refilling tube 33 and a refilling orifice 34 is not essential, and the article 30 may comprise any other suitable means of facilitating the refilling of the aerosol-generating material storage area 39 with aerosol generating material 32.

The refilling orifice 34 and/or the refilling tube 33 may be sealable, for example with a cap or one-way valve, in order to ensure that aerosol-generating material 32 does not leak out of the refilling orifice 34. Although the refilling orifice 34 is illustrated in FIG. 2 as being on the same end or surface of the article 30 as the air channel 23 and interface with the aerosol provision device 20, this is not essential. The refilling orifice 34 may be located at the end of the article 30 comprising the mouthpiece 35, for example proximate to the outlet of the air channel 23 on the mouthpiece 35, such that the refilling tube 33 extends between the end of the article 30 comprising the mouthpiece 35 and the aerosol-generating material storage area 39. In this case, the article 30 does not necessarily need to be separated from the aerosol-generating device 20 in order to refill the article 30 with aerosol-generating material 32, as the refilling orifice 34 is not obstructed by the aerosol-generating device 20 when the article 30 is coupled with the aerosol provision device 20.

The article 30 illustrated in FIG. 2 also comprises article control circuitry 38 configured to control the operation of the article 30 and store parameters and/or data associated with the article 30. The parameters and/or data associated with the article 30, referred to herein as article data, may include, for example, a serial number and/or stock keeping unit (SKU) for the article 30 or other means of identifying the article 30 and/or the type of the article 30, a date of manufacture and/or expiry of the article 30, an indication of the number of times the article 30 has been refilled, the capacity of the aerosol-generating material storage area 39 and/or the amount of aerosol-generating material remaining in the aerosol-generating material storage area 39. As described above in relation to the device control circuitry 28, the article control circuitry 38 can be provided in various different ways, for example using one or more suitably programmed programmable computer(s) and/or one or more suitably configured application-specific integrated circuit(s)/circuitry/chip(s)/chipset(s) configured to provide the desired functionality. For example, the article control circuitry 38 may comprise a microcontroller unit (MCU) or a system on chip (SoC).

The article 30 illustrated in FIG. 2 also comprises one or more connectors 31, such as contact electrodes, connected via electrical wiring to the aerosol generator 36 and the article control circuitry 38. In use, the article 30 is coupled to the aerosol-generating device 20 and the connectors 31 mate with connectors on the aerosol-generating device, thereby allowing electrical power and electrical current to be supplied from the battery 14 of the aerosol-generating device 20 to the aerosol generator 36 and the article control circuitry 38.

Figure 3:
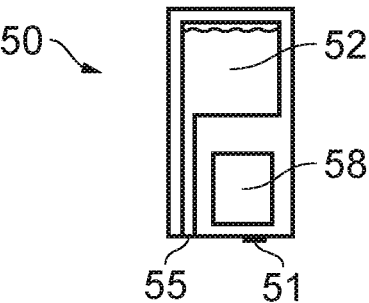
FIG. 3 is a schematic diagram of an example refilling device and a reservoir for refilling the article illustrated in FIG. 2.
Figure 3:
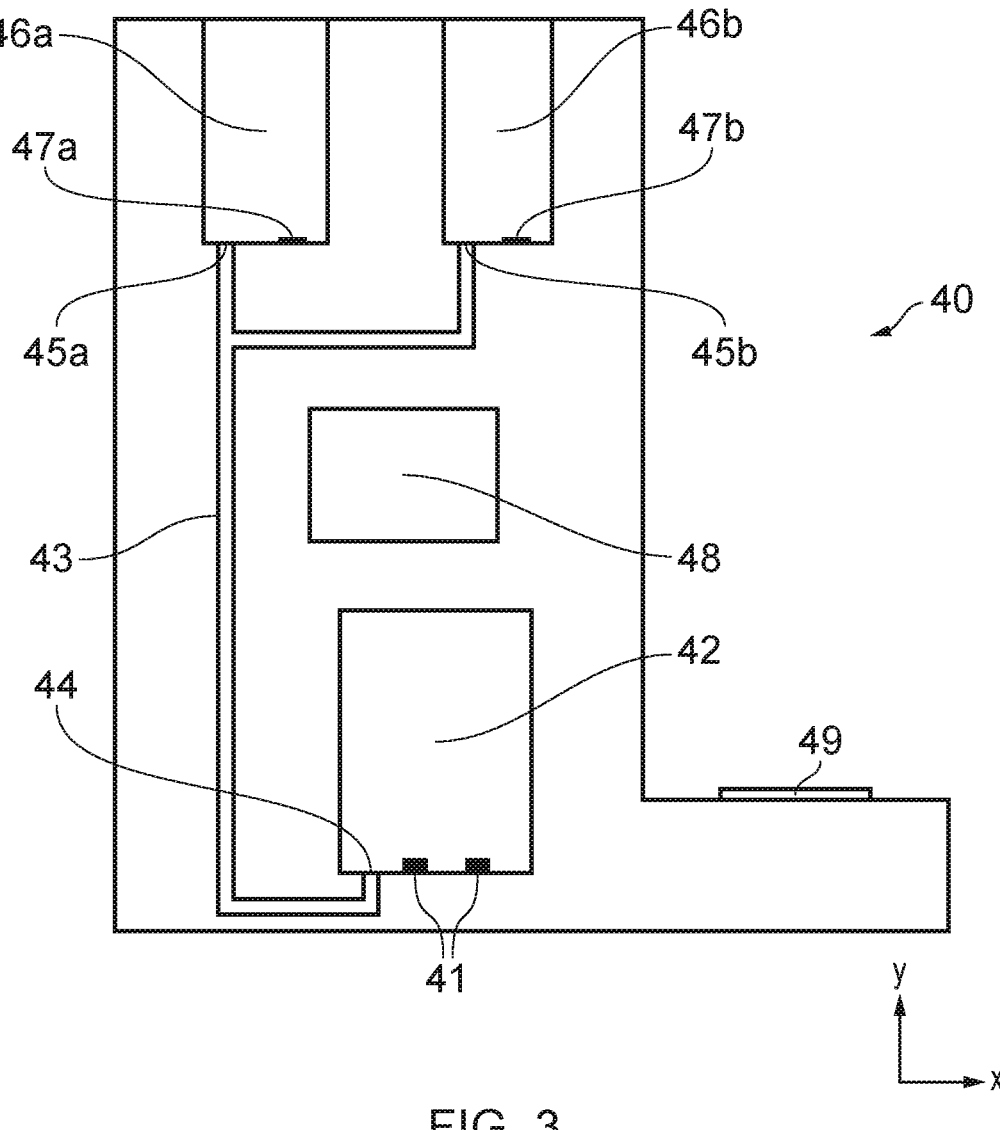

FIG. 3 is a schematic diagram of a refilling device 40 for an article of an aerosol provision system, such as the article 30 illustrated in FIG. 2, and a reservoir 50. The reservoir 50 is a disposable/replaceable part which contains aerosol-generating material 52. The refilling device 40 facilitates the transfer of the aerosol-generating material 52 from the reservoir 50 to the article 30 in order to refill or replenish the aerosol-generating material storage area 39 of the article 30 with aerosol-generating material. The article 30 can then be reused as part of the aerosol provision system 10 described above, whilst the reservoir 50 can be disposed of when the aerosol-generating material 52 within the reservoir 50 has been depleted. This allows a single article 30 to be refilled using multiple reservoirs, thereby increasing the number of uses of a single article 30.

The refilling device 40 comprises an article interface 42 configured to receive the article 30. The article interface 42 may comprise a slot, tray, opening or aperture on the refilling device 40 into or onto which the article 30 is placed or coupled. Alternatively the article interface 42 may comprise a lead or other cable which is attachable or otherwise connectable to the article 30. Although one article interface 42 is illustrated in FIG. 3, the refilling device 40 may comprise more than one article interface 42, for example three, five or ten, depending on the specific design of the refilling device 40. In this case, two or more of the article interfaces 42 may be different such that the refilling device 40 is capable of receiving different types of article, or two or more of the article interfaces 42 may be the same such that the refilling device 40 is capable of receiving multiple articles of the same type.

The refilling device 40 also comprises one or more reservoir interfaces 46 configured to receive a reservoir 50. In the same fashion as described above in relation to the article interface 42, each of the reservoir interfaces 46 may comprise a slot, tray, opening or aperture on the refilling device 40 into or onto which the reservoir 50 is placed or coupled. Alternatively, each reservoir interface 46 may comprise a lead or other cable which is attachable or otherwise connectable to the reservoir 50. Although two reservoir interfaces 46 are illustrated in FIG. 3, this is not essential and the refilling device 40 may comprise fewer or more reservoir interfaces 46, for example one, three, five or ten, depending on the specific design of the refilling device 40.

The refilling device 40 also comprises refilling control circuitry 48 configured to control the operation of the refilling device 40. As described above in relation to the device control circuitry 28, the refilling control circuitry 48 can be provided in various different ways, for example using one or more suitably programmed programmable computer(s) and/or one or more suitably configured application-specific integrated circuit(s)/circuitry/chip(s)/chipset(s) configured to provide the desired functionality. For example, the refilling control circuitry 48 may comprise a microcontroller unit (MCU) or a system on chip (SoC).

Although not illustrated, the refilling device 40 may also comprise a power source, such as a battery, configured to supply electrical power to the components of the refilling device 40. Alternatively, the power source may be an external power supply, such as a mains electricity supply or an external battery pack, to which the refilling device 40 can be coupled, attached or otherwise connected.

As described above, the reservoir 50 comprises aerosol-generating material 52 for transferring, by the refilling device 40, to the article 30 in order to refill or replenish the aerosol-generating material 32 in the aerosol-generating material storage area 39 of the article 30.

The reservoir 50 illustrated in FIG. 3 also comprises reservoir control circuitry 58 configured to control the reservoir 50 and store parameters and/or data associated with the reservoir 50. The parameters associated with the reservoir 50, herein referred to as reservoir data, may include data indicative of an amount of aerosol-generating material 52 stored in the reservoir 50, data relating to the aerosol-generating material 52 stored in the reservoir 50, such as one or more ingredients, the concentration and/or amount of the ingredients and/or one or more flavorants within the aerosol-generating material 52. The data may also comprise an identifier, such as a serial number and/or SKU for the reservoir 50 or other means of identifying the reservoir 50 and/or the type of the reservoir 50, and a date of manufacture and/or expiry of the reservoir 50. As described above in relation to the device control circuitry 28, the reservoir control circuitry 58 can be provided in various different ways, for example using one or more suitably programmed programmable computer(s) and/or one or more suitably configured application-specific integrated circuit(s)/circuitry/chip(s)/chipset(s) configured to provide the desired functionality. For example, the reservoir control circuitry 58 may comprise a microcontroller unit (MCU) or a system on chip (SoC). Alternatively, the reservoir control circuitry 58 may comprise a code printed onto the reservoir, such as a barcode or QR code, or an NFC chip or other form of passive tag.

The refilling device 40 illustrated in FIG. 3 also comprises one or more connectors 41, such as contact electrodes, connected via electrical wiring to the refilling control circuitry 48 and the power source (not illustrated). The connectors 41 are located proximate to or as part of the article interface 42. This facilitates communication between the refilling control circuitry 48 and the article control circuitry 38; the connectors 31 on the article 30 mate with the connectors 41 on the refilling device 40 when the article 30 is received by the article interface 42, thereby allowing power to be supplied from the refilling device 40 to the article control circuitry 38 and electrical signals to be transferred between the refilling control circuitry 48 and the article control circuitry 38. The connectors 41 may be arranged relative to the article interface 42 in a pattern and position matching/mirroring the connectors 31 on the article 30 in order to facilitate the mating of the connectors 31 on the article 30 and the connectors 41 on the refilling device 40 when the article 30 is received by the article interface 42.

In the same fashion, the refilling device 40 illustrated in FIG. 3 also comprises one or more connectors 47, such as contact electrodes, located proximate to or as part of each of the reservoir interfaces 46 and connected via electrical wiring to the refilling control circuitry 48 and the power source (not illustrated). The connectors 47 mate with the connectors 51 on the reservoir 50 when the reservoir 50 is received by the reservoir interface 46, thereby allowing power to be supplied from the refilling device 40 to the reservoir control circuitry 58 and electrical signals to be transferred between the refilling control circuitry 48 and the reservoir control circuitry 58. The connectors 47 may be arranged relative to the reservoir interface 46 in a pattern and position matching/mirroring the connectors 51 on the reservoir 50 in order to facilitate the mating of the connectors 51 on the reservoir 50 and the connectors 47 on the refilling device 40 when a reservoir 50 is received by one of the reservoir interfaces 46.

Although the connectors 31, 41, 47, 51 are described herein as physical electrical connectors between the article, the refilling device and the reservoir, in an alternative implementation one or more of the electrical connections between the respective components may be a wireless connection, such as NFC, RFID, or inductive coupling.

The refilling device 40 illustrated in FIG. 3 also comprises a refilling outlet 44 located proximate to or as part of the article interface 42, a refilling inlet 45 located proximate to or as part of each of the reservoir interfaces 46, and a duct 43 connecting each refilling inlet 45 to the refilling outlet 44. The refilling outlet 44 is configured to mate with the refilling orifice 34 on the article 30 when the article is received by the article interface 42, and each refilling inlet 45 is configured to mate with a reservoir outlet 55 when a reservoir 50 is received by the corresponding reservoir interface 46. The duct 43 is configured to facilitate the transfer of aerosol-generating material 52 from each of the refilling inlets 45 to the refilling outlet 44, thereby providing a transfer path for aerosol-generating material 52 from the reservoir 50 through the refilling device 40 and into the article 30.

Although the refilling outlet 44 is illustrated in FIG. 3 as being on the same end or surface of the article interface 42 as the connectors 41, this is not essential. The refilling outlet 44 may be located anywhere proximate to or in the article interface 42 relative to the connectors 41 in order for the refilling outlet 44 to mate with the refilling orifice 34 on the article 30 whilst the connectors 41 on the refilling device 40 mate with the connectors 31 on the article 30 when the article 30 is received by the article interface 30. Similarly, the refilling inlet 45 may be located anywhere proximate to or in each reservoir interface 46 relative to the connectors 47 in order for the refilling inlet 45 to mate with the reservoir outlet 55 on the reservoir 50 whilst the connectors 47 on the refilling device 40 mate with the connectors 51 on the reservoir 50 when a reservoir 50 is received by a reservoir interface 46.

Further, as described above, the refilling device 40 may be configured to receive different types, designs or configuration of article 30 using the same article interface 42. In this case, there may be multiple configurations of connectors 41 and/or refilling outlets 44 proximate to or in the article interface 42 in order to facilitate the same article interface 42 receiving different types, designs or configurations of article 30. Equally, there may be multiple configurations of connectors 47 and/or refilling inlets 45 proximate to or in each reservoir interface 46 in order to facilitate the same reservoir interface 46 receiving different types, designs or configurations of reservoir 50. Alternatively or in addition, the configuration of connectors 47 and/or refilling inlets 45 proximate to or in the one or more of the reservoir interfaces 46 may be different such that different reservoir types are received by different reservoir interfaces 46 of the same refilling device 40.

One or more of the refilling outlet 44, the refilling inlets 45, the reservoir outlet 55 and the duct 43 may also include a means of controlling the rate and/or direction of transfer of the aerosol-generating material 52, for example a ball valve, needle valve or diaphragm to control the rate of transfer and/or a one way valve such as a check valve or non-return valve to control the direction of transfer. For example, a one way valve may be located at or proximate to each of the refilling outlet 44, the refilling inlets 45 and the reservoir outlets 55 to ensure that aerosol-generating material 52 can only be transferred from the reservoir 50 to the refilling device 40 and from the refilling device 40 to the article 30, whilst a single ball valve or diaphragm may be located on or in the duct 43 of the refilling device 40 in order to control the flow rate of aerosol-generating material 52 from the reservoir 50 through the refilling device 40 and into the article 30. Equally, a ball valve or diaphragm may be located proximate to each refilling inlet 45 in order to independently control the rate of transfer of aerosol-generating material 52 into each of the refilling inlets 45 or from each of the refilling inlets 45 into the duct 43. For example, this allows the refilling control circuitry 48 to prevent a first aerosol-generating material 52 being transferred from a first reservoir 50 whilst a second aerosol-generating material 52 is being transferred from a second reservoir 50 to the article 30. This also allows the refilling control circuitry 48 to facilitate the transfer the first aerosol-generating material 52 from the first reservoir 50 and the second aerosol-generating material 52 from the second reservoir 50 simultaneously to the article 30, but at different transfer rates, thereby creating an aerosol-generating material 32 in the article 30 containing a mixture of the first aerosol-generating material 52 and the second aerosol-generating material 52 at different concentrations.

The refilling device 40 illustrated in FIG. 3 also optionally comprises a device interface 49 configured to receive the aerosol provision device 20 in order to supply electrical power from the refilling device 40 to the aerosol provision device 20. This electrical power can be used, for example, to recharge the power source or battery 14 of the aerosol provision device 20 and to facilitate the transfer of electrical signals between the refilling control circuitry 48 and the device control circuitry 28. This allows the user to use the refilling device 40 as a means of charging the aerosol provision device 20 whilst the article 30 is being replenished with aerosol-generating material 32, thereby reducing the number of associated devices needed to operate and maintain the aerosol provision system 10. The device interface 49 may be a wired interface, such as using electrical connectors as described above, or a wireless interface such as inductive or capacitive coupling. The device interface 49 may also be configured to the transfer of data between the refilling control circuitry 48 and the device control circuitry 28. The refilling control circuitry 48 may be configured to read data from the aerosol provision device 20 and/or write data to the aerosol provision device 20, for example to perform a software update, thereby installing an updated version of software onto the device control circuitry 28.

As set out above, the refilling device 40 facilitates the transfer of aerosol-generating material 52 from the reservoir 50 to the article 30 in order to refill or replenish the article 30 so that it can be reused as part of the aerosol provision system 10. By way of a concrete example, when a reservoir 50 is received by one of the reservoir interfaces 47, the connectors 47 located proximate to or in the corresponding reservoir interface 46 mate with the connectors 51 on the reservoir 50 and the refilling inlet 45 located proximate to or in the corresponding reservoir interface 46 mates with the reservoir outlet 55. When an article 30 is received by the article interface 42, the connectors 41 located proximate to or in the article interface 42 mate with the connectors 31 on the article 30 and the refilling outlet 45 mates with the refilling orifice 34 on the device 30. The refilling control circuitry 48 is then configured to facilitate the transfer of aerosol-generating material 52 from the reservoir 50 to the article 30 by facilitating the transfer of aerosol-generating material 52 from the reservoir 50 into the duct 42 of the refilling device 40 via the reservoir outlet 51 and the refilling inlet 45, and from the duct 42 of the refilling device 40 into the aerosol-generating material storage area 39 of the article 30 via the refilling outlet 44, the refilling orifice 34 and the refilling tube 33.

In the examples where the refiling device 40 has a plurality of reservoir interfaces 46, the refilling control circuitry 48 is configured to selectively facilitate the transfer of aerosol-generating material 52 from a reservoir 50 received by one of the reservoir interfaces 46, for example in response to a determination that only one of the reservoir interfaces 46 has received a reservoir 50, or in response to a selection of a particular reservoir 50 from which aerosol-generating material 52 should be transferred, for example a user input or a determination based on one or more parameters of each of the reservoirs 50 stored on the respective reservoir control circuitry 58. In this case, the refilling control circuitry 48 is configured to receive, from a user of the refilling device 40, a selection of one or more reservoir interfaces 46 and selectively facilitate the transfer of aerosol-generating material 52, from each reservoir 50 connected to one of the one or more selected reservoir interfaces 46, to the article 30 when the article 30 is coupled to the refilling device. In other words, the refilling control circuitry 48 is configured to only transfer aerosol-generating material 52 from a reservoir 50 connected to a selected reservoir interface 46, and prevent aerosol-generating material 52 from being transferred from any other reservoir 50 connected to the refilling device 40.

Although not illustrated, in some examples, the refilling device 40 can comprise a tank, container or other such receptacle for storing aerosol-generating material 52 received from the reservoir 50, for example when a reservoir 50 is received by the reservoir interface 46 without an article 30 being received by the article interface 42, thereby allowing the reservoir 50 to be disconnected from the reservoir interface 46 before an article 30 is received by the article interface 42. In this case, the aerosol-generating material 52 is stored in the receptacle of the refilling device 40 until such a time that it can be transferred to an article 30 received by the article interface 42. In this case, control circuitry 48 of the refilling device 40 is configured to facilitate the transfer of aerosol-generating material 52 from the reservoir 50 to the receptacle, and subsequently and separately to facilitate the transfer of the aerosol-generating material 52 from the receptacle to the article 42.

The receptacle of the refilling device 40 can also be used to facilitate the mixing of aerosol-generating material 52 before it is transferred to the article 30. For example, if a first reservoir interface 46 receives a first reservoir 50 containing a first aerosol-generating material 52 and a second reservoir interface 46 receives a second reservoir 50 containing a second aerosol-generating material 52, then the refilling control circuitry 48 can be configured to facilitate the transfer of the first aerosol-generating material 52 from the first reservoir 50 into the receptacle, and facilitate the transfer of the second aerosol-generating material 52 from the second reservoir 50 into the receptacle. The first aerosol-generating material 52 and the second aerosol-generating material 52 can then be mixed in the receptacle, and the mixture of the first aerosol-generating material 52 and the second aerosol-generating material 52 transferred to the article 30.

Figure 4:
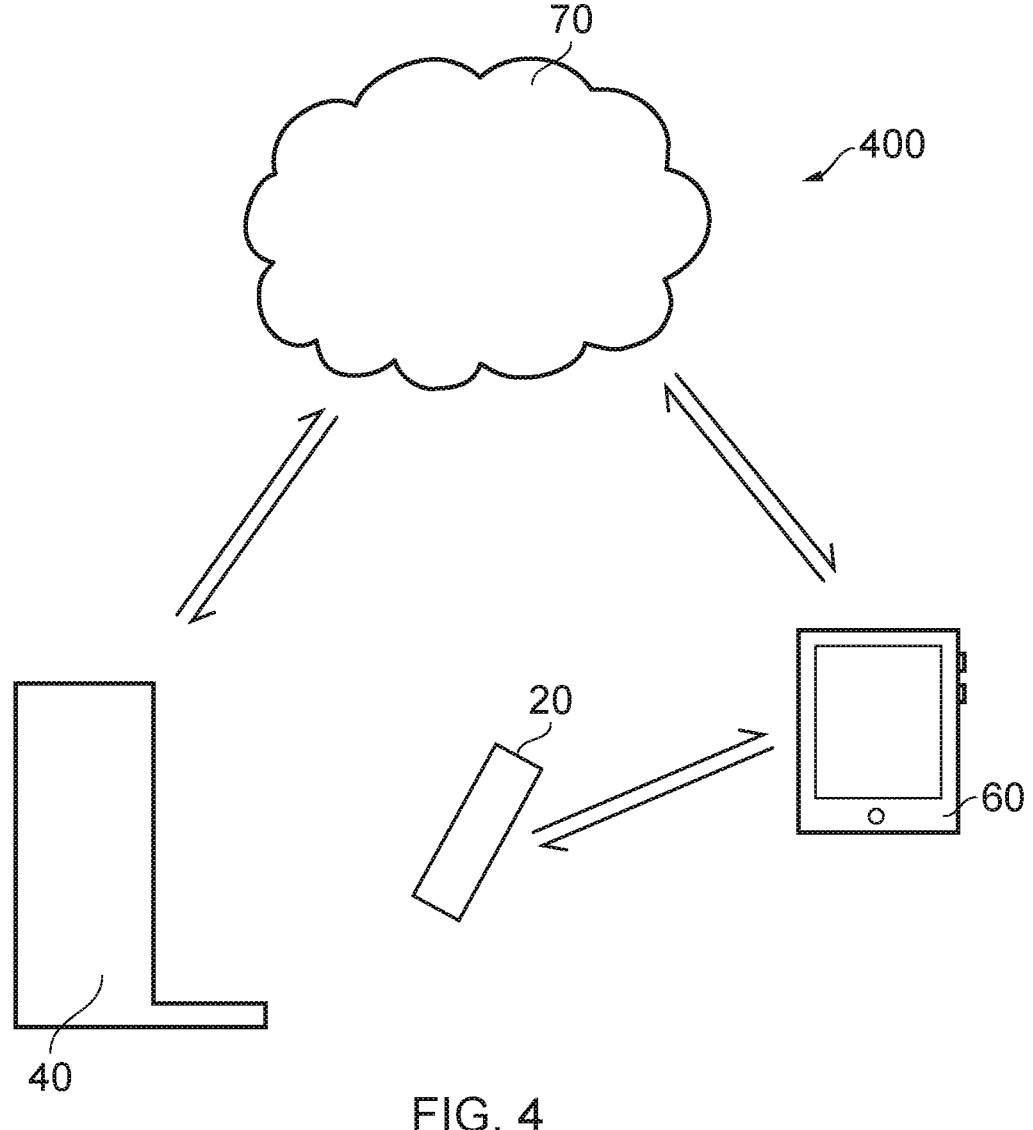
FIG. 4 is a schematic diagram of a system including the computer.

FIG. 4 illustrates a system 400 comprising the refilling device 40, a remote data store 70, and a computer 60, each of which is communicatively coupled. The remote data store 70 may be a physical server or a virtualized infrastructure such as cloud storage. The computer 60 may include any suitable electronic device that can be communicatively coupled to the remote data store 70 and the refilling device 40. For example, the computer 60 may include a mobile device (such as a smartphone), a PDA, a personal computer, laptop, tablet, smartwatch, etc. The computer 60 is associated with the aerosol provision system 10.

The remote data store 70 is configured to communicate with the refilling device 40 and the computer 60 using a wireless communication protocol, such as Wi-Fi, Bluetooth or using a cellular network. The communication means used between the remote data store 70 and the refilling device 40 between the remote data store 70 and the computer 60 may be the same or may be different. As illustrated in FIG. 4, the refilling device 40 may be configured to only communicate with the computer 60 via the remote data store 70, or the refilling device 40 may be configured to also communicate directly with the computer 60.

The computer 60 is configured to receive data from the refilling device 40 for the article 30 of the aerosol provision system 10 associated with the computer 60 via the remote data store 70 using a wireless communications protocol, such as Wi-Fi or using a cellular network as described above. The computer 60 is configured to receive, from the refilling device 40 via the remote data store 70 using the wireless communications protocol, an indication of a number of times the article 30 of the aerosol provision system 10 has been refilled with aerosol generating material 32.

The indication of the number of times the article 30 has been refilled can be represented as a counter, such that the indication is a value of the counter indicative of a number of times the article has been refilled. In some examples, the value of the counter represents the number of times the article has been refilled and is incremented each time the article is refilled. For example, the value of the counter may be zero when the article 30 is first manufactured and used (i.e. when the article is new), and the value of the counter incremented by one each time the article 30 is refilled with aerosol-generating material 32 until the value of the counter exceeds or equals the number of times the article 30 is designed or intended to be refilled in its usable life, such as 10, 50 or 100. Alternatively, when the article 30 is first manufactured and used (i.e. when the article is new), the value of the counter equals the number of times the article 30 is designed or intended to be refilled in its usable life. The value of the counter is then decremented by one each time the article 30 is refilled with aerosol-generating material 32 until the value of the counter equals zero.

In some examples, the value of the counter represents the amount of aerosol-generating material 32 that has been transferred into the article 30 by the refilling device 40 or the amount of aerosol-generating material 32 used by the article 30 during operation of the aerosol provision system 10. For example, the value of the counter may be zero when the article 30 is first manufactured and used (ie when the article is new), and the value of the counter incremented by a number representative of the amount of aerosol-generating material 32 transferred into the article 30 by the refilling device 40 during a refill. In other words, if 10 ml of aerosol-generating material 52 is transferred from a reservoir 50 to the article 30 by the refilling device 40 during a refill, the value of the counter is incremented by 10. The counter is then incremented by a number representative of the amount of aerosol-generating material 32 transferred into the article 30 by the refilling device 40 during each refill until the value of the counter exceeds or equals the total amount of aerosol-generating material the article 30 is designed or intended to be refilled with in its usable life, such as 100 ml, 500 ml or 1000 ml. Alternatively, when the article 30 is first manufactured and used (ie when the article is new), the value of the counter equals the total amount of aerosol-generating material the article 30 is designed or intended to be refilled with in its usable life. The value of the counter is then decremented by a number representative of the amount of aerosol-generating material 32 transferred into the article 30 by the refilling device 40 during each refill until the value of the counter is less than or equals zero. In both cases, the refilling control circuity 48 is configured to determine the amount of aerosol-generating material 32 transferred into the article 30 by the refilling device 40 during a refill, for example using a flow meter, flow gauge or a calibrated pump of the refilling device 40.

In some examples, the indication of the number of times the article 30 has been refilled with aerosol generating material 32 indicates that the article is expired. The article is considered to be expired when a usable life of the article 30 has been reached or exceeded, indicating that the article 30 should no longer be used and should be replaced. The usable life of the article 30 is defined or set based on a number of factors, such as the degradation and reliability of components within the article 30, such as the aerosol generator 36 and aerosol-generating material transfer component 37. The usable life of the article 30 is therefore defined or set in order to ensure safe, reliable and consistent operation of the article 30, and that the article 30 is replaced before the article 30 adversely impacts the operation of the aerosol provision system 10.

The indication of the number of times the article 30 has been refilled with aerosol generating material 32 can be a data field or flag is stored on the article 30, the value of which indicates that the article 30 is expired. For example, a flag or data field may be a binary value, where "0" indicates the article is not expired and "1" indicates the article 30 is expired, or the flag or data field may be a Boolean or logical operator, where "false" indicates the article 30 is not expired and "true" indicates the article 30 is expired.

Alternatively, as described above, the indication of a number of times the article 30 has been refilled with aerosol generating material 32 can take the form of a value of a counter. In this case, the computer 60 can determine whether the article 30 has expired by comparing the value of the counter to a refill limit. The refill limit is configured such that it is representative of the usable life of the article 30, and the article 30 is determined to be expired when the refill limit is met or passed. In the examples described above where the counter is incremented when aerosol-generating material 52 is transferred from the reservoir 50 to the article 30, it is determined that the article 30 is expired when the value of the counter is equal to or exceeds the refill limit, where in the refill limit represents the number of times the article 30 is designed or intended to be refilled during its usable life, such as 10, 50 or 100, or the total amount of aerosol-generating material 32 the article 30 is designed or intended to be refilled with in its usable life, such as 100 ml, 500 ml or 1000 ml, depending on the whether the value of the counter represents the number of times the article 30 has been refilled or the total amount of aerosol-generating material 32 the article 30 has refilled with. In the examples described above where the counter is decremented when aerosol-generating material 52 is transferred from the reservoir 50 to the article 30, the refill limit is zero. In other words, it is determined that the article 30 is expired when the value of the counter is equal to or less than zero (the refill limit). The refill limit may be stored on the computer 60, for example in memory, or the refill limit can be received from the refilling device 40 via the remote data store 70, either with the indication of the number of times the article 30 of the aerosol provision system 10 has been refilled with aerosol generating material 32 or subsequently. The computer 60 may also be configured to receive, from the refilling device 40 via the remote data store 70, data indicative of whether the reservoir has expired in a similar fashion.

The computer 60 can be configured to provide a notification to a user of the computer 60 based on the indication that the article 30 and/or the reservoir 50 is expired. For example the notification may indicate to the user whether or not the article 30 is expired, or the indication may only be provided to the user when it is determined that the article 30 is expired. For example, the notification can be provided on the computer 60 by displaying a message or symbol on a display screen on the computer 60, activating an indicator light on the computer 60, emitting a sound from a speaker on the computer 60 or activating a haptic notification means on the computer 60. As will be appreciated, the notification can be provided to the user by any suitable conveying or indication means.

In some examples, the computer 60 is configured to determine one or more benefits of refilling the article 30 based on the indication of the number of times the article 30 of the aerosol provision system 10 has been refilled with aerosol generating material 32. Each time the article 30 is refilled with aerosol generating material 32, the article 30 can be reused instead of being discarded and replaced with another article 30. Accordingly, each time the article 30 is refilled, the user does need to purchase another article 30 to replace it with, or dispose of the article 30.

Refilling the article 30 results in a cost benefit, since the user does not need to buy a new article each time an article is depleted of aerosol-generating material 32; the user simply refills the article 30 with aerosol generating material 32. The cost benefit therefore can be determined based on the number of times the article 30 has been refilled. The purchase price of an article 30 may be used in the determination of the cost benefit and/or the purchase price of aerosol-generating material (for example the purchase price of a reservoir 50), since the cost benefit of refilling the article 30 can depend on the relative purchase price of an article compared to aerosol-generating material (e.g. from one or more reservoirs).

Refilling the article 30 also results in a material saving, since the article is not discarded or disposed of each time the article 30 is depleted of aerosol-generating material 32. Accordingly, fewer components of the article 30, such as the aerosol-generating material storage area 39, the aerosol-generator 36 and the mouthpiece 35, need to be produced, manufactured and assembled, thereby reducing the amount of material used and generating a material benefit.

Other benefits may also be calculated by the computer 60, such as an environmental benefit of refilling the article 30 due to the material benefit, reduction of the manufacturing emissions and/or energy required to produce a replacement article 30 and/or raw materials such as trees or coal, saved due to a replacement article not being required.

Each benefit, such as the material benefit or the cost saving, may be determined on a per refill basis (i.e. the benefit for 1 refill), the total benefit for the number of times the article has been refilled, or the total benefit until the article expires.

In some examples, the computer is configured to receive benefit data from a remote source, such as an e-commerce website or server, or other data source accessible via the internet. The benefit data may comprise data relating to the cost of an article, the cost of a reservoir and/or replacement aerosol-generating data, the amount of material used to manufacture an article, the amount of energy used to manufacture an article and/or the emissions created in manufacturing an article 30. The computer is then configured to determine the one or more benefits based on the benefit data.

The computer 60 is further configured to provide a notification to the user of the computer 60 based on the one or more benefits. For example, the computer 60 can be configured to provide an indication of one of more of the benefits on a display of the computer 60, such as the cost benefit per refill or the total material benefit for the article 30. The indication may correspond to the actual benefit, or provide a relative example, such as the number of trees saved, the number of homes the energy saved could power and/or a product the amount of money saved could buy.

In some examples, the computer 60 is also configured to receive article data from the refilling device 40 via the remote data store 70 using the wireless communications protocol. The refilling device 40 is configured to receive the article data from the article 30 in response to the article 30 being received by the article interface 42. As described above, the article data can include a serial number and/or stock keeping unit (SKU) for the article 30 or other means of identifying the article 30 and/or the type of the article 30, a date of manufacture and/or expiry of the article 30, the capacity of the aerosol-generating material storage area 39 and/or the amount of aerosol-generating material remaining in the aerosol-generating material storage area 39; in other words data indicative of an amount of aerosol-generating material 32 stored in the article 30. The indication of a number of times the article 30 has been refilled with aerosol generating material 32 may be included as part of the article data, such that the computer 60 can be configured to receive all of the article data, including the indication of a number of times the article 30 has been refilled with aerosol generating material 32, from the refilling device 40 via the remote data store 70. Alternatively, the computer 60 can be configured to receive the indication of a number of times the article 30 has been refilled with aerosol generating material 32 from the refilling device 40 first, and then receive some or all of the remaining article data as a separate operation.

The data indicative of the amount of aerosol-generating material 32 stored in the article 30 may represent the amount of aerosol-generating material 32 stored in the article 30, such as 10 ml, 50 ml or 100 ml, or it may represent the amount of aerosol-generating material 32 stored in the article 30 relative to the capacity of the aerosol-generating material storage area 39. For example, the data indicative of the amount of aerosol-generating material 32 stored in the article 30 may be an integer between 0 and 10 or between 0 and 100, where 0 represents an empty article (i.e. there is no aerosol-generating material 32 stored in the article 30) and 10 or 100 represents a full reservoir 50 (when the aerosol-generating material storage area 39 is at its capacity).

In some examples, the computer 60 is configured to receive reservoir data from the refilling device 40 via the remote data store 70 using the wireless communications protocol. The refilling device 40 is configured to receive the reservoir data from the reservoir 50 in response to the reservoir 50 being received by the reservoir interface 46.

As described above, the reservoir data can include data indicative of an amount of aerosol-generating material 52 stored in the reservoir 50, data relating to the aerosol-generating material 52 stored in the reservoir 50, such as one or more ingredients, the concentration and/or amount of the ingredients and/or one or more flavorants within the aerosol-generating material 52. The data may also comprise an identifier, such as a serial number and/or SKU for the reservoir 50 or other means of identifying the reservoir 50 and/or the type of the reservoir 50, and a date of manufacture and/or expiry of the reservoir 50. The reservoir data can be received by the computer 60 separately (i.e. at a different time) to the article data, or at the same time as the article data.

The data indicative of the amount of aerosol-generating material 52 stored on the reservoir 50 can represent the amount of aerosol-generating material 52 in the reservoir 50 or the amount of aerosol-generating material 52 that has been transferred from the reservoir 50. For example, the data indicative of the amount of aerosol-generating material stored on the reservoir 50 can be represented as a counter, the value of which may be zero when the reservoir 50 is first manufactured and new (i.e. when the reservoir is full), and the value of the counter incremented by a number representative of the amount of aerosol-generating material 52 transferred from the reservoir 50 by the refilling device 40 during a refill of the article 30. In other words, if 10 ml of aerosol-generating material 52 is transferred from the reservoir 50 to an article 30 by the refilling device 40 during a refill, the value of the counter is incremented by 10. The counter is then incremented by a number representative of the amount of aerosol-generating material 32 transferred from the reservoir 50 by the refilling device 40 during each refill until the value of the counter exceeds or equals the total amount of aerosol-generating material stored in the reservoir 50 when it is full or new, such as 10 ml, 50 ml or 100 ml. Alternatively, when the reservoir 50 is first manufactured and new (i.e. when the reservoir 50 is full), the value of the counter equals the total amount of aerosol-generating material 52 in the reservoir 50. The value of the counter is then decremented by a number representative of the amount of aerosol-generating material 52 transferred from the reservoir 50 by the refilling device 40 during each refill until the value of the counter is less than or equals zero.

In some examples, the data indicative of the amount of aerosol-generating material stored on the reservoir 50 can represents the amount of aerosol-generating material 52 in the reservoir 50 relative to the capacity of the reservoir 50 or the amount of aerosol-generating material 52 that has been transferred from the reservoir 50 relative to the capacity of the reservoir 50. For example, the data indicative of the amount of aerosol-generating material stored on the reservoir 50 could be an integer between 0 and 10 or between 0 and 100, where 0 represents an empty reservoir 50 and 10 or 100 represents a full reservoir 50 (a reservoir 50 at its capacity). This value is then incremented or decremented each time aerosol-generating material 52 is transferred from the reservoir 50 by an amount indicative of the amount of aerosol-generating material 52 transferred from the reservoir 50 relative to the capacity of the reservoir 50. For example, if the reservoir 50 stores 100 ml of aerosol-generating material 52 when the reservoir 50 is full and 10 ml of aerosol-generating material 52 is transferred from the reservoir 50, the value is incremented or decremented by 1 if the data values range between 0 and 10, and by 10 if the data values range between 0 and 100, since 10% of the capacity of the reservoir 50 has been transferred.

In some embodiments, the computer 60 is configured to receive, from the refilling device 40 via the remote data store 70, data indicative of whether the article is authentic. An authentic article 30 is an article 30 manufactured by a known or approved manufacturer, such as the same manufacturer as the refilling device 40 and reservoirs 50, whilst an inauthentic article 30 may be an imitation or counterfeit article 30, produced to a lower quality and/or may be unsafe or dangerous to use. The data indicative of whether the article is authentic may form part of the article data, such that it is received by the computer 60 in the same operation (i.e. at the same time) as the article data. Equally, the data indicative of whether the article is authentic may include a serial number of the article 30, a stock keeping unit (SKU), a public key and/checksum. The computer 60 is then configured to perform a calculation on the data in order to determine whether the article 30 is authentic. For example, a serial number or SKU could be compared to a table of serial numbers or SKUs stored on the computer in order to verify that the serial number or SKU is valid, and therefore that the article 30 is authentic. Alternative, a security or encryption operation may be performed, for example using a key stored by the computer 60 and one or more of the serial number, SKU, public key and checksum in order to authenticate the article 30. Alternatively, as described above in relation to the indication that the article is expired, the data indicative of whether the article is authentic can comprise a data field or flag, the value of which indicates whether the article 30 is authentic. For example, a flag or data field may be a binary value, where "0" indicates the article is not authentic and "1" indicates the article 30 is authentic, or the flag or data field may be a Boolean or logical operator, where "false" indicates the article 30 is not authentic and "true" indicates the article 30 is authentic. The computer 60 may also be configured to receive, from the refilling device 40 via the remote data store 70, data indicative of whether the reservoir is authentic in a similar fashion.

The computer 60 can be configured to provide a notification to the user of the computer based on the data indicative of whether the article 30 and/or the reservoir 50 is authentic. For example, the notification can be provided only if the article 30 is not authentic, or the notification can indicate to the user whether or not the article 30 is authentic. For example, the notification can be provided on the computer 60 by displaying a message or symbol on a display screen on the computer 60, activating an indicator light on the computer 60, emitting a sound from a speaker on the computer 60 or activating a haptic notification means on the computer 60. As will be appreciated, the notification can be provided to the user by any suitable conveying or indication means.

In some examples, the computer 60 is configured to receive device data from the aerosol provision device 20 of the aerosol provision system 10. The device data can include a serial number and/or stock keeping unit (SKU) for the aerosol provision device 20 or other means of identifying the aerosol provision device 20 and/or the type of the aerosol provision device 20, a date of manufacture and/or expiry of the aerosol provision device 20. The device data can also include one or more operational parameters of the device 20, such as data indicative of an amount of charge of the power source 14 of the aerosol provision device 20, data indicative of a power setting or profile of the aerosol generator 36, data indicative of the usage of the aerosol provision device 20 and/or the article 30, such as the number of inhalations and/or sessions the aerosol provision device 20 has been used for, the duration and timing of each inhalation and/or session.

As illustrated in FIG. 4, the computer 40 can be communicatively coupled to the aerosol provision device 20, such that the device data can be transmitted directly from the aerosol prevision device 20 to the computer 60. In other words, the computer 60 can receive the device data from the aerosol provision device 20 without requiring the refilling device 40 or the remote data store 70. The device data can be received by the computer 60 from the aerosol provision device 20 using a different wireless communication protocol to the wireless communication protocol used to receive data from the refilling device 40 via the remote data store 70. For example, the computer 60 can receive data from the aerosol provision device 20 using Bluetooth, whilst the computer 60 receives data from the refilling device 40 via the remote data store 70 by using Wi-Fi.

In response to receiving the device data from the aerosol provision device 20, the computer 60 can be configured to send the device data to the remote data store 70. This ensures that the remote data store 70 provides a central repository for all data received from devices associated with the aerosol provision system and the user.

Alternatively, the computer 60 can be configured to receive the device data from the refilling device 40 via the remote data 70. In this case, the refilling device 40 can receive the device data from the aerosol provision device 20 in response to the aerosol provision device 20 being coupled to the device interface 49 of the refilling device 40.

The device data may be reset, either by the device control circuitry 28 or computer 60 in response to the computing receiving the device data, so that the device data is indicative of the operational parameters of the device 20 since the computer last received device data from the aerosol provision device 20.

The computer 60 can be configured to perform one or more actions in response to receiving data, such as storing the data in memory on the computer 60 or providing the data to the user of the computer 60. The data may be provided to the user of the computer 60 as a notification described in more detail below. By storing the data in memory, the computer 60 can be configured to monitor usage of one or more of the refilling device 40, the article 30, one or more reservoirs 50 and the aerosol provision device 20 by the user using the data. In other words, the computer 60 can be configured to compare data recently received to data stored on the computer 60 in order to detect one or more trends or patterns by the user. Alternatively, the data may be stored on the remote data store 70, and the computer 60 configured to receive any required data (for example in response to a request sent by the computer 60) in order to detect trends and/or patterns by the user. For example, the computer 60 may determined that the user refills the article 30 at particular times of the day or days of the week. In response, the computer can proactively provide a notification to the user that the article 30 needs refilling and/or the reservoir needs replacing if the computer 60 determines that the user will be unable to refill the article at their usual time based on the amount of aerosol-generating material 52 in the reservoir 50. The computer 60 may detect patterns of use regarding the reservoir, such as particular sizes/capacities of reservoirs used and/or flavorants, concentrations of ingredients or other property of the aerosol-generating material 52 in the reservoirs. The computer 60 may then be configured to provide a notification to the user with a suggestion, such as using a larger or smaller size/capacity of reservoir 50 based on a determined usage pattern of the aerosol generating system 10 (ie. article 30 and aerosol provision device 20) by the user. The notification may also provide an indication of one or more benefits to the user, such as a cost benefit or material saving, to the user of changing to a larger or smaller size/capacity of reservoir 50. Equally, the notification may provide a suggestion for a reservoir containing a particular flavorant, ingredient and/or concentration of ingredient in the aerosol-generating material 52 stored in the reservoir 50. For example, the computer 60 may detect that the user regularly uses a reservoir 50 with an aerosol-generating material 52 containing a peppermint flavorant and provide a notification to the user suggesting a reservoir 50 with an aerosol-generating material 52 containing a spearmint flavorant or other flavorant which the computer 60 determined the user may enjoy based on the reservoirs 50 they have previously used. Equally, the computer 60 may suggest combinations of reservoirs 50 that the user may enjoy, where the aerosol-generating material 52 from each of the reservoirs 50 can be mixed and transferred to the article 30 as described above. The computer 60 can be configured to provide other suggestions, such as food and/or drink for the user to try that complement the particular flavorant, ingredient and/or concentration of ingredient in the aerosol-generating material 52 stored in the reservoir 50 that the user is currently or has most recently used to refill the article 30.

The computer 60 is configured to provide the indication of the number of times the article 30 of the aerosol provision system 10 has been refilled with aerosol generating material 32 to the user of the computer in response to receiving the indication. For example, the refilling control circuitry 48 may provide a notification to the user of the refilling device 40 based on the indication of the number of times the article 30 has been refilled with aerosol generating material 32. The notification may provide an indication of the number of times the article 30 has been refilled by transferring aerosol-generating material 52 from the reservoir to the article 30, or the amount of aerosol-generating material 52 that has been transferred to the article 30, either for a particular refill of the article 30 or the total amount of aerosol-generating material 52 that has been transferred to the article 30 for all refills of the article 30. In some examples the notification provides an indication of the number of times the article can be refiled (ie aerosol-generating material 52 transferred to the article 30) before the article 30 expires. In other words, the refilling control circuitry 48 is configured to use the indication of the number of times the article 30 has been refilled with aerosol generating material 32 and/or data indicative of the amount of aerosol-generating material 32 stored in the article 30, and the refill limit to determine the number of times the article 30 can be refilled before the refill limit is met and the article 30 needs to be replaced. For example, a light indicator on the computer 60, such as an amber colored LED, may be activated, or a symbol or message displayed on a display screen of the computer 60 when the article 30 has a particular number of refills remaining, such as 1, 5 or 10, or when the amount of aerosol-generating material 52 that can be transferred to the article 30 is at a particular value, such as 10 ml, 20 ml or 100 ml. Alternatively, one or more LEDs on the computer may be activated on the computer 40 to create a pattern indicative of the number of refills or amount of aerosol-generating material 52 remaining, or the number, a symbol or the indication may be displayed on a display screen of the computer 60.

In some examples a notification is provided to the user when the indication of the number of times the article 30 has been refilled with aerosol generating material 32 indicates that the article is expired and/or in response to determining that the article 30 is expired. For example, a different LED, or a different color of LED, such as a red colored LED, may be activated on the computer 60 in order to indicate to the user that the article 30 is expired. Alternatively, a message or symbol may be displayed on a display screen of the computer 60 and/or a sound played from a speaker of the computer 60 in order to indicate to the user that article 30 has expired and should be replaced.

In a similar fashion, the computer 60 may also be configured to provide a notification to the user based on one or more of the article data, the reservoir data and the device data, such as the data indicative of the amount of aerosol-generating material 52 stored in the reservoir 50, the data indicative of the amount of aerosol-generating material 32 stored in the article 30, the data indicative of an amount of charge in the power source 14 of the aerosol provision device and/or data indicative of whether the article 30 is authentic. For example, the notification may provide an indication of the amount of aerosol-generating material 32 remaining in the article 30, either as an absolute value or relative to the capacity of the aerosol-generating material storage area 39, and/or an indication of the amount of aerosol-generating material 52 remaining in the reservoir 50, either as an absolute value or relative to the capacity of the reservoir 50. The notification may provide an indication to the user of the computer that one or more of the reservoirs 50 coupled to the refilling device 40 need to be replaced, for example in response to the amount of aerosol-generating material 52 in the reservoir 50 reaching zero or failing below a threshold. The notification may also provide a reminder to the user that the reservoir 50 that needs to be replaced can be recycled.

A notification can be provided on the computer 60 by displaying a message or symbol on a display screen on the computer 60, activating an indicator light on the computer 60, emitting a sound from a speaker on the computer 60 or activating a haptic notification means on the computer 60. As will be appreciated, the notification can be provided to the user by any suitable conveying or indication means.

Figure 5:
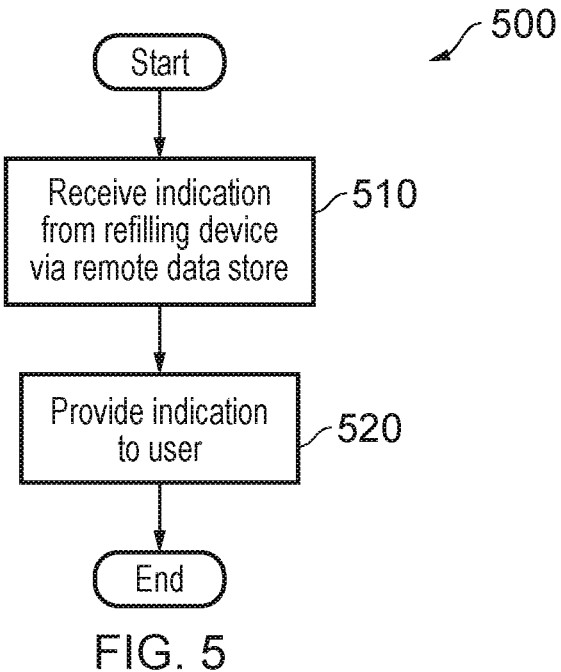
FIG. 5 is a flow chart of a method.

FIG. 5 is a flow chart of a method 500, for example performed by the computer 60. The method begins at 510, where an indication of a number of times the article 30 has been refilled with aerosol generating material 32 is received from a refilling device 40 for the article 30 of the aerosol provision system 10 via the remote data store 70 using a wireless communications protocol. At 520, the indication of the number of times the article 30 has been refilled with aerosol generating material 32 is provided to a user. The method then ends.

The method 500 illustrated in FIG. 5 may be stored as instructions on a computer readable storage medium, such that when the instructions are executed by a processor, the method 500 described above is performed. The computer readable storage medium may be non-transitory.

As described above, the present disclosure relates to (but it not limited to) a computer configured to receive, from a refilling device for an article of an aerosol provision system associated with the computer via a remote data store using a wireless communications protocol, an indication of a number of times the article of the aerosol provision system has been refilled with aerosol generating material. The computer is then configured to provide the indication to a user of the computer.

Thus, there has been described a computer, a system and method.

The various embodiments described herein are presented only to assist in understanding and teaching the claimed features. These embodiments are provided as a representative sample of embodiments only, and are not exhaustive and/or exclusive. It is to be understood that advantages, embodiments, examples, functions, features, structures, and/or other aspects described herein are not to be considered limitations on the scope of the disclosure as defined by the claims or limitations on equivalents to the claims, and that other embodiments may be utilized and modifications may be made without departing from the scope of that which is claimed. Various embodiments of the disclosure may suitably comprise, consist of, or consist essentially of, appropriate combinations of the disclosed elements, components, features, parts, steps, means, etc., other than those specifically described herein. In addition, this disclosure may include other inventions not presently claimed, but which may be claimed in future.

The invention claimed is:

1. A computer comprising programmable circuitry configured to:
   receive, from a refilling device for an article of an aerosol provision system associated with the computer via a remote data store using a wireless communications protocol, an indication of a number of times the article of the aerosol provision system has been refilled with aerosol generating material; and
   provide the indication to a user of the computer;
   receive, from the refilling device via the remote data store using the wireless communications protocol, article data, wherein the article data comprises data indicative of an amount of aerosol-generating material stored in the article; and
   provide a notification to the user of the computer based on the data indicative of the amount of the aerosol-generating material stored in the article; wherein the notification provides an indication of a number of times the aerosol-generating material is transferred to the article before the article expires.

2. The computer of claim 1, wherein the indication is a value of a counter indicative of the number of times the article has been refilled.

3. The computer of claim 1, wherein the indication indicates that the article is expired.

4. The computer of claim 3, further configured to provide a notification to the user of the computer based on the indication that the article is expired.

5. The computer of claim 1, further configured to determine one or more benefits of refilling the article based on the indication of the number of times the article of the aerosol provision system has been refilled with the aerosol generating material.

6. The computer of claim 5, wherein one of the one or more benefits comprises a cost benefit.

7. The computer of claim 5, wherein one of the one or more benefits comprises a material saving.

8. The computer of claim 5, further configured to receive benefit data from a remote source, and wherein determining one or more benefits is further based on the received benefit data.

9. The computer of claim 5, further configured to provide a notification to the user of the computer based on the one or more benefits.

10. The computer of claim 1, further configured to:
    receive, from the refilling device via the remote data store using the wireless communications protocol, data indicative of whether the article is authentic.

11. The computer of claim 10, further configured to provide a notification to the user of the computer based on the data indicative of whether the article is authentic.

12. The computer of claim 1, further configured to:
    receive, from an aerosol provision device of the aerosol provision system, device data.

13. The computer of claim 12, wherein the device data is received from the aerosol provision device using a different wireless communication protocol than the wireless communication protocol used to receive, from the refilling device via the remote data store, the indication of the number of times the article of the aerosol provision system has been refilled with the aerosol generating material.

14. The computer of claim 13, wherein the wireless communication protocol used to receive the device data is BLUETOOTH.

15. The computer of claim 12, further configured to provide a notification to the user of the computer based on the device data.

16. The computer of claim 1, further configured to:
    receive, from the refilling device via the remote data store using the wireless communications protocol, device data.

17. The computer of claim 1, further configured to:
    receive, from the refilling device via the remote data store using the wireless communications protocol, reservoir data, wherein the reservoir data comprises data indicative of an amount of the aerosol-generating material stored in a reservoir coupled to the refilling device.

18. The computer of claim 17, further configured to provide a notification to the user of the computer based on the data indicative of the amount of aerosol-generating material stored in the reservoir.

19. The computer of claim 1, wherein the computer is a mobile device.

20. The computer of claim 1, wherein the wireless communications protocol is Wi-Fi.

21. A system comprising:
    the computer of claim 1; and
    the refilling device configured to transmit the indication to the computer via a remote data store using a wireless communications protocol.

22. A method comprising:

receiving, from a refilling device for an article of an aerosol provision system via a remote data store using a wireless communications protocol, an indication of a number of times the article of the aerosol provision system has been refilled with aerosol generating material; and providing the indication to a user;

receiving, from the refilling device via the remote data store using the wireless communications protocol, article data, wherein the article data comprises data indicative of an amount of aerosol-generating material stored in the article; and providing a notification to the user of a computer based on the data indicative of the amount of the aerosol-generating material stored in the article; wherein the notification provides an indication of a number of times the aerosol-generating material is transferred to the article before the article expires.

23. A non-transitory computer readable storage medium comprising instructions which, when executed by a processor, cause the processor to perform a method comprising:

receiving, from a refilling device for an article of an aerosol provision system via a remote data store using a wireless communications protocol, an indication of a number of times the article of the aerosol provision system has been refilled with aerosol generating material; and providing the indication to a user;

receiving, from the refilling device via the remote data store using the wireless communications protocol, article data, wherein the article data comprises data indicative of an amount of aerosol-generating material stored in the article; and providing a notification to the user of a computer based on the data indicative of the amount of the aerosol-generating material stored in the article; wherein the notification provides an indication of a number of times the aerosol-generating material is transferred to the article before the article expires.

* * * * *